US007843927B1

(12) United States Patent
Grosser et al.

(10) Patent No.: US 7,843,927 B1
(45) Date of Patent: Nov. 30, 2010

(54) METHODS, SYSTEMS, AND COMPUTER PROGRAM PRODUCTS FOR ROUTING PACKETS AT A MULTI-MODE LAYER 3 PACKET FORWARDING DEVICE

(75) Inventors: Donald B. Grosser, Apex, NC (US); Edward J. Rovner, Chapel Hill, NC (US); Olen L. Stokes, Cary, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 568 days.

(21) Appl. No.: 11/644,701

(22) Filed: Dec. 22, 2006

(51) Int. Cl.
*H04L 12/28* (2006.01)
*H04L 12/56* (2006.01)

(52) U.S. Cl. .................. 370/392; 709/238; 709/239; 709/240; 709/242; 370/389

(58) Field of Classification Search ............. 370/392, 370/389; 709/238–242
See application file for complete search history.

(56) References Cited

U.S. PATENT DOCUMENTS

| 4,277,844 | A | 7/1981 | Hancock et al. |
|---|---|---|---|
| 4,335,458 | A | 6/1982 | Krol |
| 4,464,747 | A | 8/1984 | Groudan et al. |
| 4,617,664 | A | 10/1986 | Aichelmann et al. |
| 4,775,978 | A | 10/1988 | Hartness |
| 4,958,350 | A | 9/1990 | Worley et al. |
| 5,056,095 | A | 10/1991 | Horiguchi et al. |
| 5,058,115 | A | 10/1991 | Blake et al. |
| 5,251,219 | A | 10/1993 | Babb |
| 5,257,391 | A | 10/1993 | DuLac et al. |
| 5,453,998 | A | 9/1995 | Dang |
| 5,463,644 | A | 10/1995 | Rodi et al. |
| 5,680,579 | A | 10/1997 | Young et al. |

(Continued)

OTHER PUBLICATIONS

Commonly-assigned, co-pending U.S. Patent Application for "Methods, Systems, and Computer Readable Media for Automatically Selecting Between Internet Protocol Switching Modes on a Per-Module Basis in a Packet Forwarding Device," U.S. Appl. No. 12/820,111 (Unpublished, filed Jun. 21, 2010).

(Continued)

*Primary Examiner*—John Pezzlo
*Assistant Examiner*—Jeremy Costin
(74) *Attorney, Agent, or Firm*—Jenkins, Wilson, Taylor & Hunt, P.A (57) ABSTRACT

The subject matter described herein includes methods, systems, and computer program products for routing packets at a multi-mode layer 3 packet forwarding device. According to one aspect, the subject matter described herein includes operating a first of at least two modules in a host mode, and operating a second of at least two modules in a longest prefix matching (LPM) mode. Operating a module in a host mode includes populating a host table and an LPM table with entries corresponding to hosts and routing layer 3 packets received by the first module using the host and LPM tables. Operating a module in an LPM mode includes populating a host table with entries corresponding to hosts, populating an LPM table with entries corresponding to variable length Internet protocol (IP) addresses and next hop addresses, and routing layer 3 packets received by the second module using the host and LPM tables.

16 Claims, 7 Drawing Sheets

U.S. PATENT DOCUMENTS

| | | | |
|---|---|---|---|
| 6,034,957 | A | 3/2000 | Haddock et al. |
| 6,295,299 | B1 | 9/2001 | Haddock et al. |
| 6,470,425 | B1 | 10/2002 | Yamashiroya |
| 6,792,423 | B1 * | 9/2004 | Jeffries et al. ............ 707/6 |
| 6,947,931 | B1 * | 9/2005 | Bass et al. ............... 707/6 |
| 7,028,213 | B2 | 4/2006 | Majni et al. |
| 7,174,441 | B2 | 2/2007 | Singh et al. |
| 7,386,663 | B2 | 6/2008 | Cousins |
| 7,724,734 | B1 | 5/2010 | Grosser et al. |
| 2003/0061558 | A1 | 3/2003 | Fackenthal et al. |
| 2003/0163660 | A1 | 8/2003 | Lam |
| 2004/0052251 | A1 * | 3/2004 | Mehrotra et al. ......... 370/389 |
| 2004/0170156 | A1 * | 9/2004 | O'Neill ................. 370/349 |
| 2005/0025072 | A1 * | 2/2005 | Okada et al. ............ 370/256 |
| 2005/0076010 | A1 * | 4/2005 | Bass et al. .............. 707/3 |
| 2005/0201302 | A1 * | 9/2005 | Gaddis et al. ........... 370/254 |
| 2005/0232204 | A1 * | 10/2005 | Bass et al. ............. 370/335 |
| 2006/0002386 | A1 * | 1/2006 | Yik et al. .............. 370/389 |
| 2006/0187930 | A1 | 8/2006 | Smith et al. |

OTHER PUBLICATIONS

Official Action for U.S. Appl. No. 12/060,111 (Mar. 29, 2010).
Official Action for U.S. Appl. No. 10/934,928 (Feb. 19, 2010).
Notice of Allowance and Fee(s) Due for U.S. Appl. No. 11/317,665 (Jan. 11, 2010).
Official Action for U.S. Appl. No. 10/934,928 (Jun. 10, 2009).
Final Official Action for U.S. Appl. No. 11/317,665 (May 11, 2009).
Final Official Action for U.S. Appl. No. 10/934,928 (Dec. 2, 2008).
Official Action for U.S. Appl. No. 11/317,665 (Oct. 1, 2008).
Commonly-assigned, co-pending U.S. Appl. No. 12/060,111 for "Method and Systems for Automatic Expansion and Contraction of IP Host Forwarding Database," (Unpublished, filed Mar. 31, 2008).
Official Action for U.S. Appl. No. 10/934,928 (Feb. 22, 2008).
Notification of Transmittal of the International Search Report and the Written Opinion of the International Searching Authority, or the Declaration for PCT/US2005/031939 (Jan. 11, 2006).
Commonly-assigned, co-pending U.S. Appl. No. 10/934,928 for "Memory Array Error Correction," (Unpublished, filed Sep. 3, 2004).
Netlogic Microsystems, Product Brief NSE5000GLQ, available at: http://www.netlogicmicro.com/datasheets/nse5000gIq.html, (Copyright 2004).
Van Ess, "A Circular FIFO, PSoC Style," Cypress Microsystems, Application Note AN2036, Rev. B, pp. 1-5 (Jun. 21, 2002).
Liu, "Routing Prefix Caching in Network Processor Design," IEEE proceedings, Computer Communications Networks, p. 18-23 (Oct. 15-17, 2001).
Zhang, "Recovery of Memory and Process in DSM Systems: HA Issue #1," Hewlett-Packard Co. HPL-2001-76 (Mar. 30, 2001).
Alzahrani et al., "On-Chip TEC-QED ECC for Ultra-Large, Single-Chip Memory Systems," Computer Design: VLSI in Computers and Processors, 1994. ICCD '94 Proceedings, IEEE International Conference on Cambridge, MA, Oct. 12, 1994, Los Alamitos, CA, IEEE Computer Society, pp. 132-137 (Oct. 10, 1994).
Rijsinghani, "Computation of the Internet Checksum via Incremental Update," Network Working Group, RFC 1624 (May 1994).
Mallory et al., "Incremental Updating of the Internet Checksum," Network Working Group, RFC 1141 (Jan. 1990).
Braden et al., "Computing the Internet Checksum," Network Working Group, RFC 1071 (Sep. 1988).
Patterson et al., A Case for redundant Arrays of Inexpensive Disks (RAID), ACM (1988).

* cited by examiner

| LPM MODE | HOST TABLE: | | | LPM TABLE: | |
|---|---|---|---|---|---|
| 400 | FULL LENGTH HOST ENTRIES | NEXT HOP INFORMATION | 402 | VARIABLE LENGTH IP PREFIXES | PREFIX LENGTH | NEXT HOP INFORMATION |

FIG. 4A

| HOST MODE | HOST TABLE: | | | LPM TABLE: | |
|---|---|---|---|---|---|
| 404 | FULL LENGTH HOST ENTRIES | NEXT HOP INFORMATION | 406 | FULL LENGTH HOST ENTRIES | FIXED FULL LENGTH PREFIXES | NEXT HOP INFORMATION |

FIG. 4B

| HYBRID MODE | HOST TABLE: | | | LPM TABLE: | |
|---|---|---|---|---|---|
| 408 | FULL LENGTH HOST ENTRIES | NEXT HOP INFORMATION | 410 | FULL LENGTH HOST ENTRIES / VARIABLE LENGTH IP PREFIXES | FIXED FULL LENGTH PREFIXES / PREFIX LENGTH | NEXT HOP INFORMATION / NEXT HOP INFORMATION |

METHODS, SYSTEMS, AND COMPUTER PROGRAM PRODUCTS FOR ROUTING PACKETS AT A MULTI-MODE LAYER 3 PACKET FORWARDING DEVICE

TECHNICAL FIELD

The subject matter described herein relates to routing layer 3 packets. More particularly, the subject matter described herein relates to methods, systems, and computer program products for routing layer 3 packets at a multi-mode layer 3 packet forwarding device.

BACKGROUND

Packet forwarding devices, such as layer 3 or Internet protocol (IP) routers, typically use one or more tables to store packet forwarding information. Typically, packet forwarding devices include one or more hardware-implemented tables in addition to software-implemented tables in order to reduce packet forwarding information lookup time. For example, layer 3 packet forwarding devices may include a hardware-implemented host table populated with entries corresponding to individual hosts. When a packet arrives at a layer 3 packet forwarding device, a lookup may first be performed in the hardware host table. If the lookup is successful, the packet may be forwarded to a host corresponding to the matching entry in the table. If the lookup in the hardware host table fails to locate a match, a lookup may be performed in a longest prefix matching (LPM) table to locate the entry with the longest prefix that matches the address in the received packet. If the lookup in the LPM table fails to locate a longest prefix match, a software routing table may be searched in order to successfully forward the packet.

In some implementations, a hardware-implemented host table stores entries corresponding to hosts directly connected to the packet forwarding device. Each entry in the host table may include an IP address of a locally connected host and corresponding forwarding information. When a layer 3 packet arrives at the packet forwarding device, a lookup may be performed in the host table based on the destination IP address in the packet. This lookup is typically performed using a hashing function that identifies matching entries using a search key. If a matching entry is located, the corresponding packet forwarding information is extracted from the host table and used to forward the packet to the destination host. Host tables are typically searched before other tables because they store the most specific forwarding information for layer 3 packets.

A hardware-implemented LPM table stores subnet addresses and subnet masks to be applied to destination IP addresses of incoming packets. When a layer 3 packet is received, logical steps may be performed by a packet forwarding device where the subnet mask for each entry in the LPM table is applied to the destination IP address of the packet, and the masked address is searched in the table. In some implementations, these steps may be performed in a single LPM lookup using a special data structure, such as a Radix tree. The entry with the longest prefix that matches the masked address in the received packet is used to extract next hop address information for the packet. The next hop address typically corresponds to the next hop or machine in a path through which a remote host corresponding to the destination IP address in the packet is reachable. Using an LPM table allows remote hosts to be identified by next hops without requiring entries in the LPM table for each individual remote host. Thus, LPM tables may reduce a large number of hosts into fewer route entries by combining entries with the same next hop information. This allows an LPM table to store matching entries for more hosts than a host table of the same size.

Software lookups are performed by searching a much larger software table that stores layer 3 packet forwarding information. Lookups performed in software are significantly slower than lookups performed in hardware and therefore, it is desirable to perform as few lookups in software as possible.

As stated above, both host and LPM tables may be implemented or stored in hardware of a layer 3 packet forwarding device. In some implementations, the memory space available for both tables is shared. In order to increase the routing efficiency of conventional layer 3 packet forwarding devices, the relative sizes of the host and LPM tables are based on the expected number of communicating IP hosts. For example, edge devices that connect to a small number of hosts may utilize more memory for the host table and less for the LPM table. Devices, referred to as aggregators, that serve many communicating IP hosts may utilize more memory for the LPM table and less for the host table. Aggregators typically connect numerous smaller devices to a network infrastructure backbone or core network device and therefore route packets for a large number of hosts.

In edge devices, it may be desirable to route packets primarily using a host table, since the size of the host table would be small. In aggregators, it may be desirable to route packets primarily using an LPM table, since its entries represent plural hosts and populating a host table with all possible hosts would result in a table size that exceeds available memory space.

Layer 3 packet forwarding devices may have multiple modules, each containing host and LPM tables, for forwarding layer 3 packets. Conventionally, these modules are programmed identically and contain identical host and LPM tables as described above. However, as described above, it may be desirable to route some packets primarily using a host table and others primarily using an LPM table. Conventional IP packet forwarding devices do not provide for such varied operation.

Accordingly, there exists a need for improved methods, systems, and computer program products for routing layer 3 packets.

SUMMARY

The subject matter described herein includes methods, systems, and computer program products for routing packets at a multi-mode layer 3 packet forwarding device. According to one aspect, the subject matter described herein includes operating a first of at least two modules in a host mode, and operating a second of at least two modules in a longest prefix matching (LPM) mode. Operating a module in a host mode includes populating a host table and an LPM table with entries corresponding to hosts and routing layer 3 packets received by the first module using the host and LPM tables. Operating a module in an LPM mode includes populating a host table with entries corresponding to hosts, populating an LPM table with entries corresponding to variable length Internet protocol (IP) addresses and next hop addresses, and routing layer 3 packets received by the second module using the host and LPM tables.

The subject matter described herein for routing packets at a multi-mode layer 3 packet forwarding device may be implemented in hardware or a combination of hardware and software or firmware. The subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be implemented on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
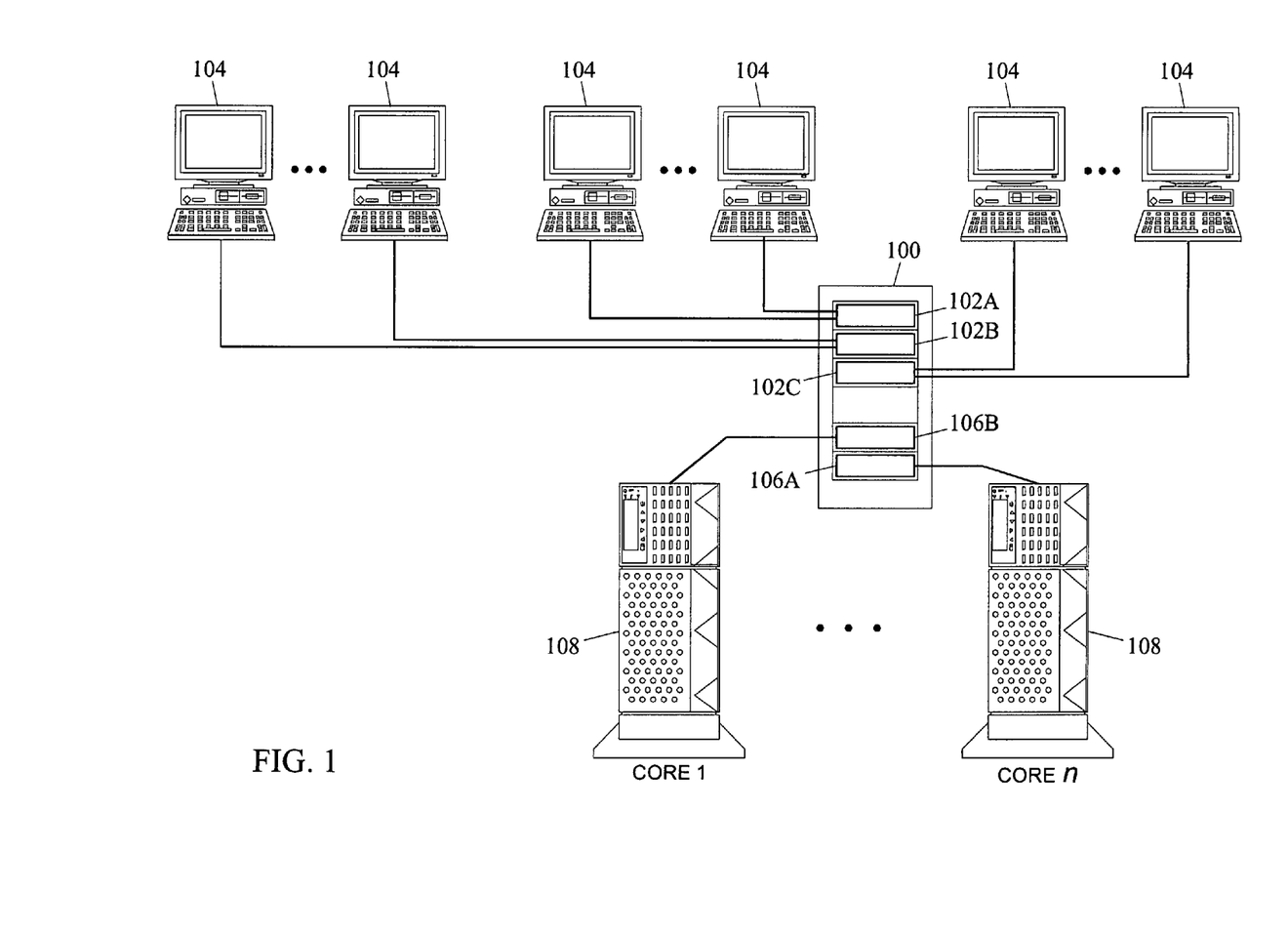
FIG. 1 is a network diagram illustrating a multi-mode layer 3 packet forwarding device including edge modules connected to multiple end terminal devices and aggregator modules connected to one or more core network devices according to an embodiment of the subject matter described herein.

FIG. 1 is a network diagram illustrating a multi-mode layer 3 packet forwarding device including edge modules connected to multiple end terminal devices and aggregator modules connected to one or more core network devices according to an embodiment of the subject matter described herein. Referring to FIG. 1, layer 3 packet forwarding device 100 may include one or more I/O modules, where each I/O module includes a host table and an LPM table implemented in hardware for increased table lookup speed. For example, packet forwarding device 100 may include edge modules 102A-102C connected to end terminals 104, which represent a relatively small number of communicating hosts. In one embodiment, edge modules 102A-102C each include a host table and an LPM table, where both tables may include entries corresponding to directly connected hosts. Aggregator modules 106A and 106B connect to one or more core network devices 108 and therefore handle a much larger traffic volume than edge modules 102A-102C. Aggregator modules 106A and 106B may each include LPM tables with entries corresponding to variable length address prefixes and next hops for reaching destinations. Aggregator modules 106A and 106B may also include host tables for directly connected hosts. Modules 102A-102C, 106A and 106B may be operated in multiple different modes. For example, in one possible implementation of packet forwarding device 100 that includes three edge modules 102A-102C and two aggregator modules 106A and 106B, edge modules 102A-102C and may be operated in a host mode and, aggregator modules 106A and 106B may be operated in LPM mode. In this way, a single layer 3 packet forwarding device can be tuned to efficiently forward packets for both large and small numbers of communicating hosts. The modes will be described in further detail below.

Figure 2:
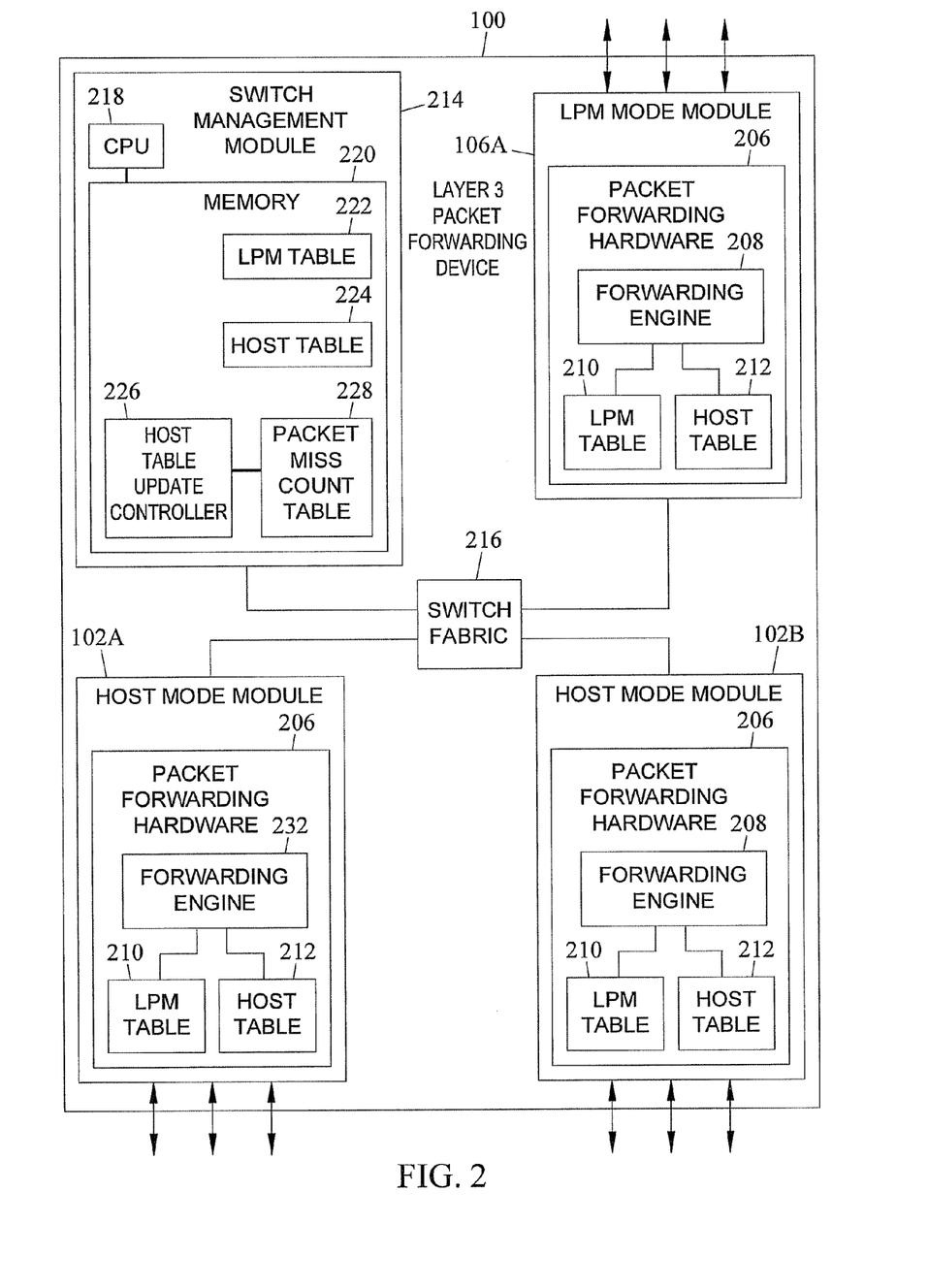
FIG. 2 is a block diagram illustrating exemplary components of a multi-mode layer 3 packet forwarding device that routes layer 3 packets including modules operating in a host mode, an LPM mode, and a hybrid mode according to an embodiment of the subject matter described herein.

In one exemplary implementation, the mode of each module depends on how it is provisioned in light of its expected utilization as an edge module, an aggregator module, or a module that processes an amount of traffic in between the amount processed by an edge and an aggregator module. In FIG. 2, for example, modules 102A, 102B, and 106A operate in a mode based on the how LPM tables 210 are provisioned. For example, LPM table 210 and host table 212 located on module 102A may be populated with full-length 32 or 128 bit host entries, and therefore LPM table 210 located on module 102A operates in a host mode. The tables located on module 102B may be provisioned similarly to those located on module 102A. Hence, module 102B may also operate in host mode. Module 106A includes a host table 212 with a small number of entries corresponding to directly connected hosts and a larger LPM table 210 with variable length prefixes and next hop addresses. Hence, module 106A may operate in LPM mode. A third I/O module (not shown in FIG. 2) may operate in a hybrid mode where the host table has full address entries for directly connected hosts and the LPM table has some entries with variable length prefixes and others with full host addresses.

In addition to I/O modules, multimode packet forwarding device 100 illustrated in FIG. 2 includes a switch management module 214 and a switch fabric 216. Switch management module 214 controls the overall operation of modules 102A, 102B, and 106A. In addition, switch management module 214 includes a CPU 218 that controls its operation and a memory 220 that stores software implemented host and LPM tables. In particular, memory 220 includes an LPM table 222 that includes copies of all of the entries in LPM tables 210 maintained by the individual I/O modules. Host table 224 may contain copies of all of the entries in host tables 212 maintained by the individual I/O modules. Tables 222 and 224 may also include entries that have been learned through participation in routing protocols that are not present on the individual I/O modules. Switch management module 214 also includes a host table update controller 226 that controls the updating of host tables 212 maintained by the I/O modules in a packet miss count table 228 that facilitates this updating. Switch fabric 216 switches packets between I/O modules 102A, 102B, and 106A and switch management module 214.

As stated above, one type of entry that may be included in an LPM table is a variable length IP address prefix. Table 1 shown below illustrates an example of a variable length IP address prefix entry that may be included in an LPM table.

TABLE 1

Exemplary LPM Table Entry

| Variable Length IP Prefix/Mask Length | Gateway IP Address | VLAN | Port |
|---|---|---|---|
| 128.160.0.0/16 | 194.162.1.1 | 3 | 1 |

In the LPM table entry illustrated above, the first column contains the subnet and mask length to be applied to incoming packets. The second column includes the IP address of a gateway connected to the remote subnet. The next column includes a virtual local area network (VLAN) tag to be applied to packets sent to the subnet. The final column specifies a port in the packet forwarding device to which the layer 3 packet should be forwarded. It should be noted that the gateway IP address may be used to locate a layer 2 address corresponding to the gateway. In addition, it should also be noted that the structure for the LPM table entry illustrated in Table 1 is merely an example of information that may be used to forward a packet. Fields may be added, deleted, or replaced without departing from the scope of the subject matter described herein. In addition, the fields in Table 1 may be distributed across multiple tables without departing from the scope of the subject matter described herein.

As stated above, another type of entry that may be included in a host or LPM table is a full IP address entry. Table 2 shown below illustrates an exemplary full IP address entry that may be included in a host table or an LPM table according to an embodiment of the subject matter described herein.

TABLE 2

Exemplary Layer 3 Full IP Address Table Entry

| Host IP Address | Locally Attached? | Multicast? | VLAN | MAC Table Index | Hit Bit | Birth |
|---|---|---|---|---|---|---|
| 128.156.0.1 | N | N | 3 | MAC 5 | 1 | 11/29/05, 09:00 |

In the exemplary layer 3 host table entry, the first column stores a 32 bit destination host IP address for IPv4 addresses. For IP version 6 addresses, the width of the first column or field may be extended to handle 128 bit length corresponding to IPv6 addresses. The next column indicates whether the host is locally attached. The next column indicates whether the address is a multicast address. In the illustrated example, the host is not locally attached and the address is not a multicast address. The next column specifies the VLAN tag to be added to packets sent to the remote host. The next column stores an index to a media access control (MAC) address table which stores the MAC address of the gateway through which the remote host is reachable.

The next two columns in the host table store information that is useful for updating a host table. The birth field indicates the time that the entry was added to the host table and may be used along with the packet count to determine whether to replace the entry. The hit bit field is a binary value that indicates whether the entry has been accessed within a preceding predetermined time period. In one possible embodiment, this predetermined time period is the age-out period for entries used to scan host table 212 and LPM table 210 located on modules 102A-106A for old entries. The hit bit may be a user-configurable value corresponding to each remote host entry, and may be used to remove entries in the host and LPM tables. One example of removing entries in the host and LPM tables based on the hit bit is described in FIG. 3C. As with Table 1, fields in the host table may be replaced, deleted, or distributed across multiple tables without departing from the scope of the subject matter described herein.

Data such as that illustrated above in Tables 1 and 2 may be stored in hardware on I/O modules 102A, 102B, and 106A. In the example illustrated in FIG. 2, each I/O module includes packet forwarding hardware 206 that implements a packet forwarding engine 232 and that stores LPM and host tables 210 and 212. In one implementation, packet forwarding engine 232 may first perform a lookup in host table 212 in order to determine where to forward a received packet. If the lookup in host table 212 fails, a lookup will be performed in its local LPM table 210. If a lookup in the local LPM table 210 fails, the packet is forwarded to switch management module 214, which performs lookups in tables 222 or 224 to forward the packet.

As stated above, switch management module 214 includes a host table update controller 226 that controls the updating of host table 224. In one embodiment, host table update controller 226 can maintain a count of packet forwarding lookup misses that are required to be looked up by CPU 218 in LPM table 222 and host table 224. As described above, tables 222 and 224 may include entries that have been learned but that have not been populated to hardware. When a miss occurs using packet forwarding hardware 206 on one of the modules 102A, 102B, and 106A, the packet may be forwarded to switch management module 214 for forwarding. Switch management module 214 performs a lookup in LPM table 222 or host table 224 and forwards the packet. Host table update controller 226 maintains a packet miss count table 228 to track the number of packets for which packet forwarding hardware lookups resulted in a miss. Host table update controller 226 may control updating of entries and host table 212 based on the miss counts.

Figure 3A:
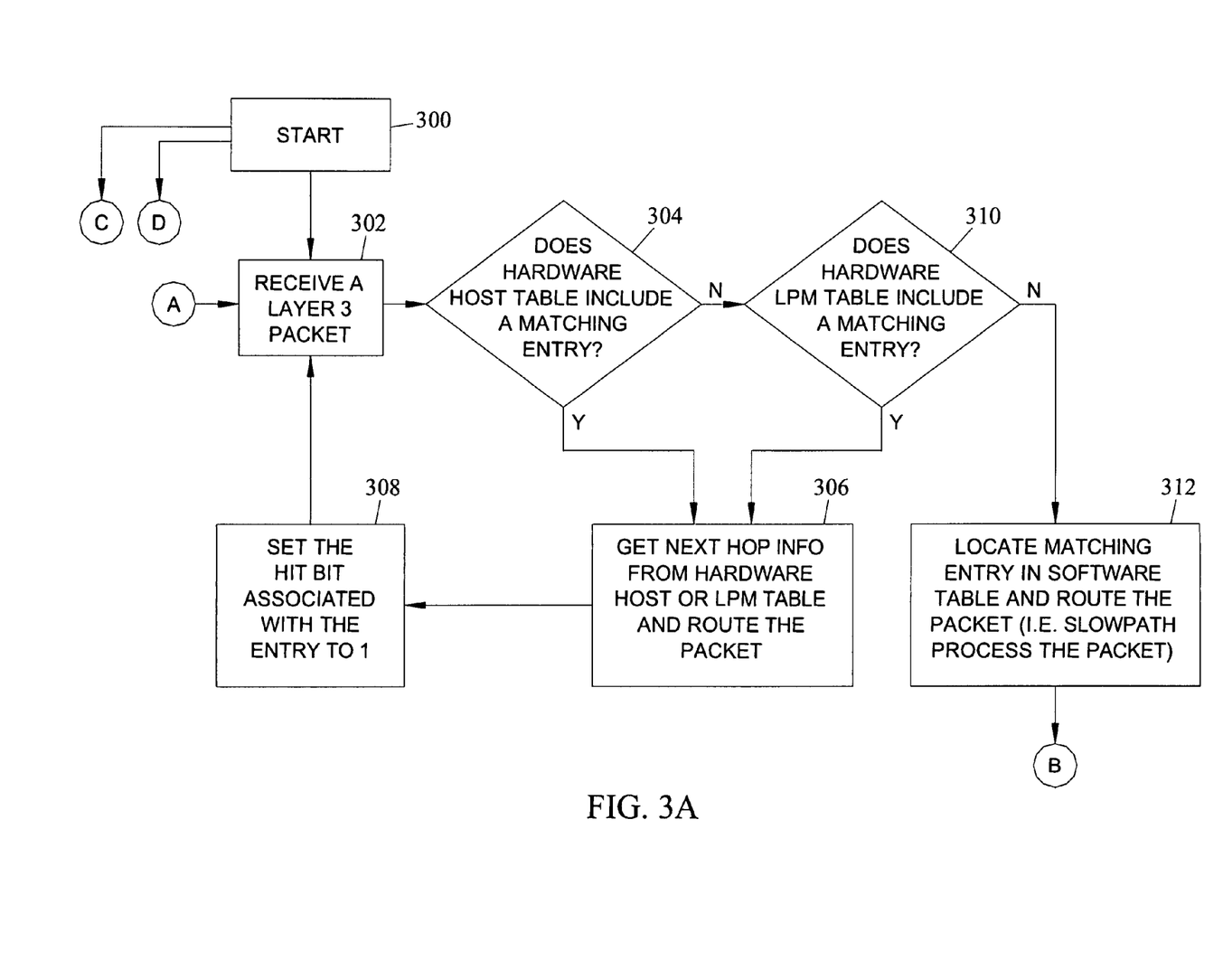
FIGS. 3A-3C are flow charts illustrating exemplary steps for routing packets at a layer 3 packet forwarding device that includes modules that may be operated in host mode, LPM mode, and hybrid mode according to an embodiment of the subject matter described herein.
Figure 3B:
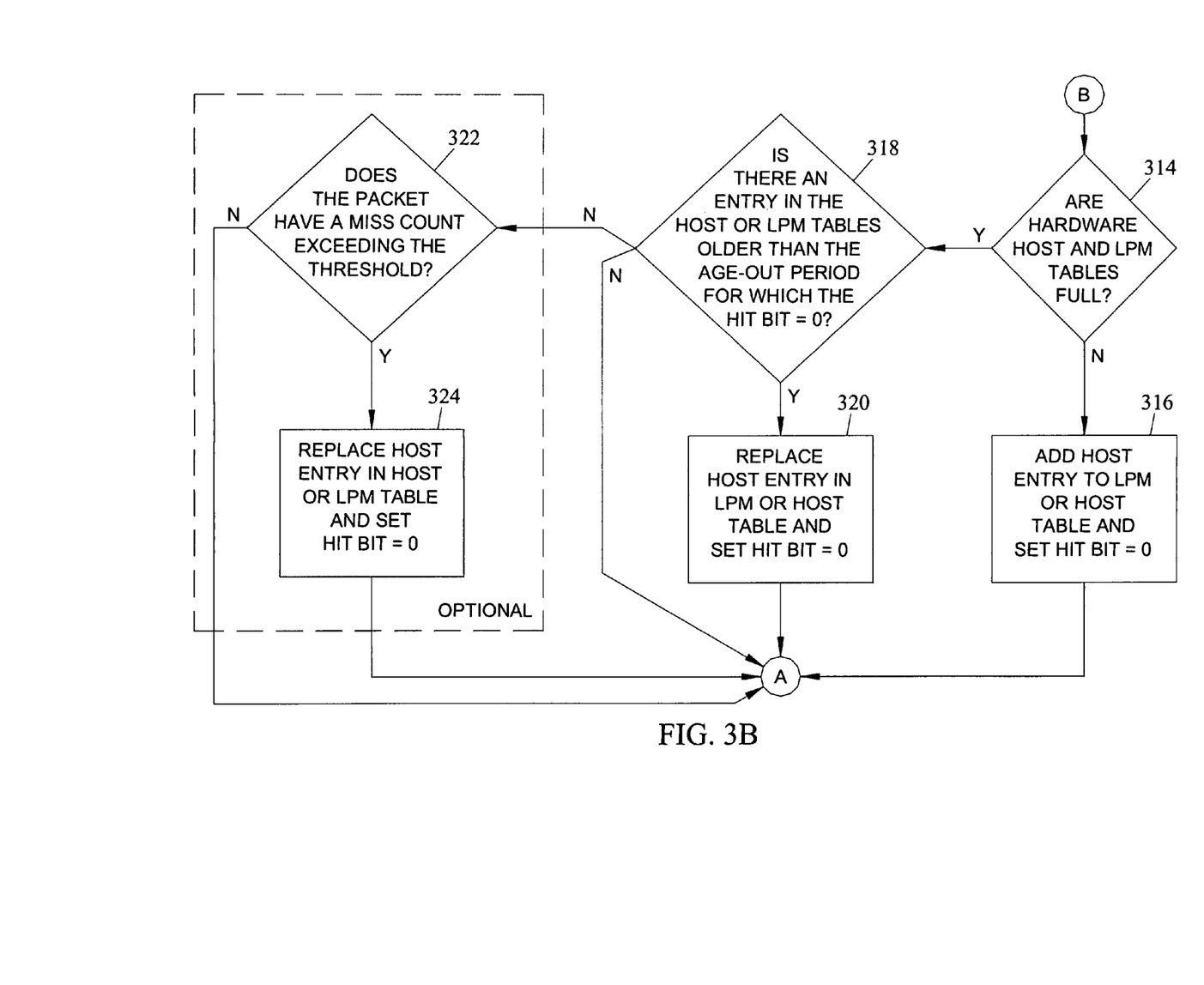
Figure 3C:
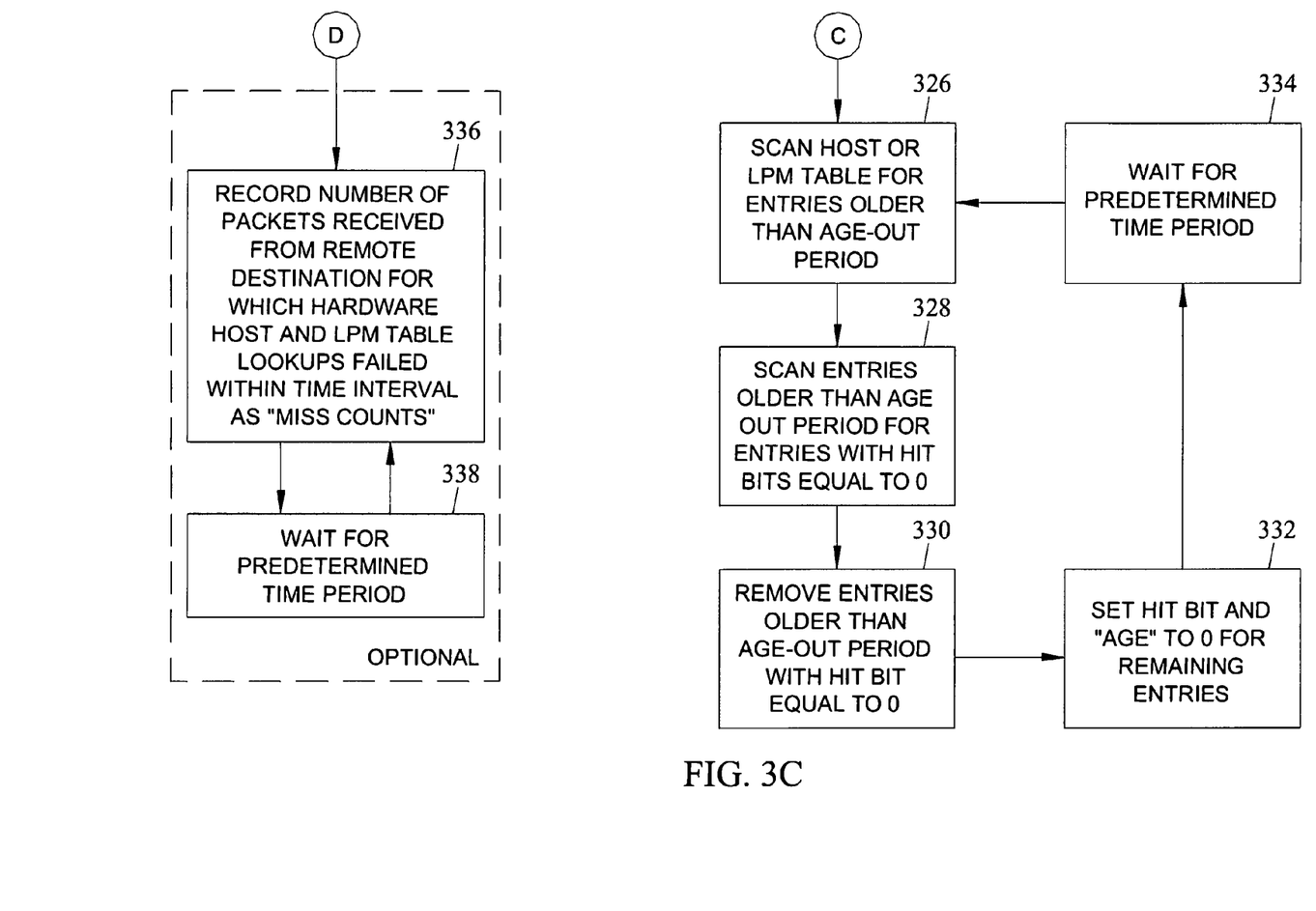

FIGS. 3A-3C are flow charts illustrating exemplary processes for routing packets at a layer 3 packet forwarding device that includes modules that may be operated in host mode, LPM mode, and hybrid mode according to an embodiment of the subject matter described herein. The exemplary processes for routing layer 3 packets illustrated in FIGS. 3A-3C may be performed by I/O modules operating in any of the modes described above. FIGS. 3A and 3B illustrate exemplary steps for forwarding layer 3 packets. The steps described in FIGS. 3A and 3B form a continuous loop, where packets are received by a layer 3 packet forwarding device, routed to their destination or next hop, and another packet is received. These steps may utilize information generated by background processes performed simultaneously with the steps described in FIGS. 3A-3B. These background processes are illustrated in FIG. 3C, and may be continuously performed by a layer 3 packet forwarding device in addition to the primary steps required for forwarding packets described in FIGS. 3A-3B.

Referring to FIG. 3A, in step 300, a layer 3 packet forwarding device is initialized, and one or more background processes may automatically begin. Once initialized, the packet forwarding device is ready to receive and forward layer 3 packets. In step 302, a layer 3 packet is received at a layer 3 packet forwarding device where modules may be operated in host mode, LPM mode, or hybrid mode. In order to forward the packet to its destination or next-hop, destination information is extracted from the packet and used to first search host table for a matching entry in step 304. In one implementation, a hashing algorithm is used to locate matching entries in the host table. If a matching entry is found, control proceeds to step 306, where next hop information associated with the entry is located and used to route the packet. In step 308, a hit bit associated with the entry is set to a binary value of 1 indicating that a matching entry was found in host table.

Alternatively, in this example, if a matching entry is not found in one of host tables 212 located on modules 102A, 102B, or 106A in step 304, control proceeds to step 310 where the LPM table on the module that received the packet is searched for a matching entry. In one example, the LPM table is operated in host mode on a host-mode module and therefore is populated with full fixed-length host entries. Again, if a matching entry is found in the LPM table, next hop information is located and used to route the packet and its hit bit is set to 1 in steps 306-308.

If no matching entry is found in either the hardware-implemented host table 212 or the hardware-implemented LPM table 210 on the module that received the packet, a slower lookup is performed in software using tables 222 and 224, and the result of the lookup is used to route the packet. Unlike layer 3 packets routed using matching entries located in hardware-implemented tables, packets routed as the result of a software lookup do not automatically get added to a hardware table with a hit bit equal to 1. Rather, a determination is made in steps 314-320 illustrated in FIG. 3B whether to add the software processed entry to one of hardware tables. In step 314, it is determined whether the entry processed in software in step 312 can be stored in either hardware-implemented table. If space is available, the entry is added to the hardware table in step 316, the hit bit is set to 0, and a next layer 3 packet is received.

If no available space exists in hardware host table 212 or hardware LPM table 210 located on the module that received the packet, it is determined whether to replace an entry in steps 318-320. In step 318, the age of entries is determined by comparing the birth date of each entry, as illustrated in Table 2, to the time tables are scanned. Entries older that the predetermined age-out period with a hit bit equal to 0 are located in step 318 and replaced by a new entry in step 320. If no entry exists that satisfies the replacement criteria described above in either hardware table, no entry is replaced, and a next layer 3 packet is received according to step 302.

In another embodiment, steps 322-324 may be performed in addition to step 320 if an entry is located in the host or LPM tables older than the age-out period for which the hit bit equals 0. In step 322, the miss count of the packet is examined. If the miss count for the packet exceeds a predetermined threshold, it is added to the host or LPM table with a hit bit equal to 0, and an existing entry is replaced in step 324. If the miss count does not exceed the threshold, no entry is replaced in either hardware-implemented table, and control proceeds to step 302.

Referring to FIG. 3C, steps 326-338 illustrate a background process for periodically removing old entries from hardware tables 212 located at module 102A, 102B, and 106A and resetting the hit bits of the remaining entries. In steps 326-334, LPM table 210 and host table 212 located on modules 102A-106A are scanned for entries older than the age out period with hits bits equal to 0. The entries identified in steps 328 are removed from the tables and the hit bits of the remaining entries are set to 0, in steps 330-332. In step 334, a predetermined time period elapses before returning to the scanning process in step 328. Thus, steps 326-334 illustrate a method for ensuring that hardware host and LPM tables are not populated with old and unaccessed entries.

In another implementation, additional steps 336 and 338 may be performed. In steps 336 and 338, host-mode module 102A may periodically record the number of packets received during a time interval for which hardware host and LPM table lookups failed, and a miss occurred. The results of steps 336 and 338 are miss counts associated with entries processed in software in step 312. These miss counts may be used to determine whether or not to replace an entry in one of the hardware tables. As described above, in steps 322-324, a packet that has been processed in software is added to a hardware table if its miss count exceeds a predetermined threshold. Alternatively, if the packet's miss count does not exceed the threshold, it is not added to a hardware table.

Although in the examples illustrated in FIGS. 3A-3C, miss counts may be stored for each entry present in the host table. In an alternate implementation, usage counts, indicating how many times an entry has been used, may be stored and updated for each host table entry. The usage counts may be compared with miss counts to determine whether or not to replace host table entries. In one possible implementation, usage counts may be maintained by packet forwarding hardware 206 illustrated in FIG. 2 such that each module contains a real time or near real time count of its host table entry usage. In such an implementation, host table update controller 226 may include a component that exists in packet forwarding hardware 206 to maintain the usage counts and a component that executes on the switch management module or on the individual modules to maintain miss counts, compare the miss counts to the usage counts, and replace entries in the host table with entries according to the miss counts if the miss counts exceed the usage counts and a threshold number of miss counts.

In one implementation, a layer 3 packet forwarding device may contain host and LPM tables that are initially unpopulated. Therefore, when a first packet is received, no matching entry will be found in either hardware-implemented host or LPM tables and the packet will be added to a hardware table with a hit bit set to 0. Referring to FIGS. 3A-3B, all layer 3 packets received until the hardware tables will be filled are processed in this way. When subsequent packets are received that have matching entries located in a hardware table, additional steps may be performed. If the received packet is found in a hardware table, its hit bit is set to 1. If the received packet is not located in a hardware table, a determination is made whether to add it to one of the hardware tables. One method includes replacing entries stored in hardware that are older than the age-out period and have a hit bit set to 0, indicating that they have not been accessed since they were first added to the table. Another method includes replacing entries stored in a hardware table if the received packet has a miss count higher than a predetermined threshold, indicating that it has been software processed many times. These possible methods may be used together or separately to use the limited space available in hardware-implemented host tables.

Figure 4A:
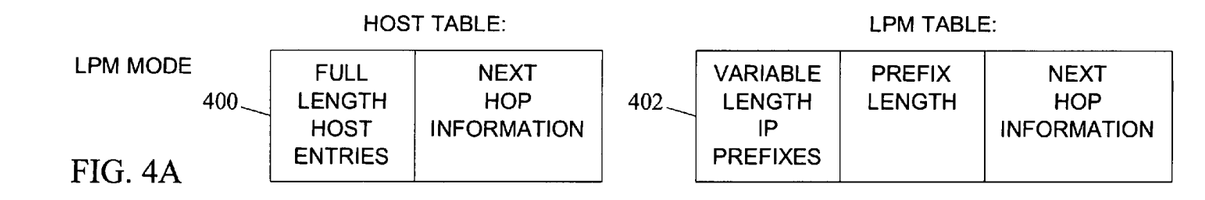
FIGS. 4A-4C are exemplary host and LPM tables operated in host mode, LPM mode, and hybrid mode according to an embodiment of the subject matter described herein.
Figure 4B:
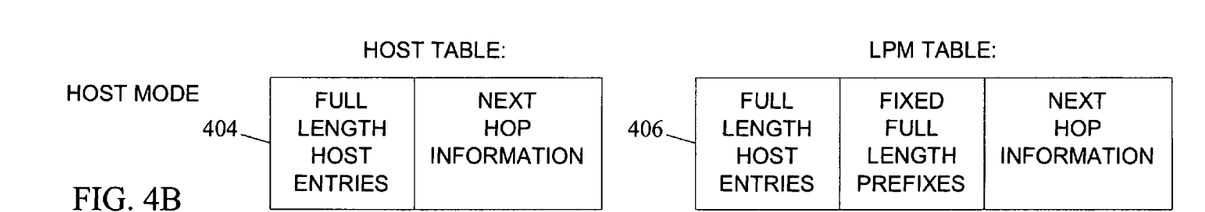
Figure 4C:
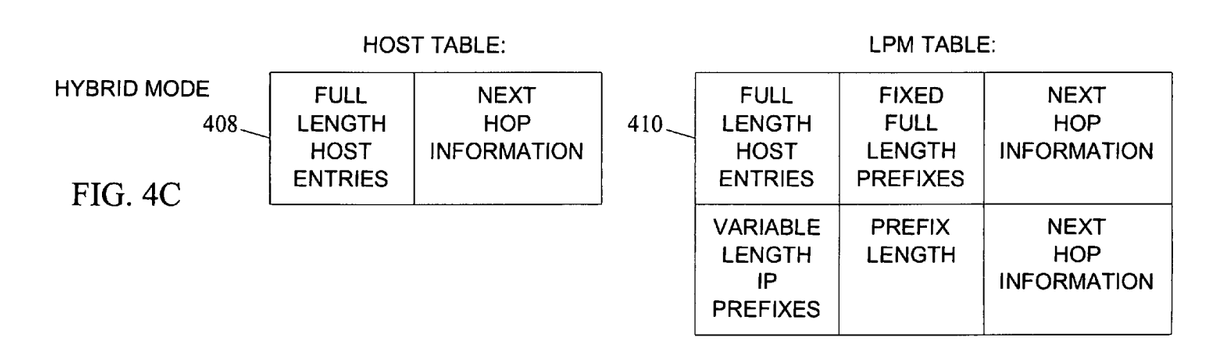

FIGS. 4A-4C are exemplary host and LPM tables for operating modules in LPM mode, host mode, and hybrid mode, respectively. Referring to FIG. 4A, in host table 400, the memory space is populated with full length entries corresponding to hosts and related next hop information for routing layer 3 packets. Full length host entries comprise 32 bits for IPv4 addresses, or 128 bits for IPv6 addresses. The full length host entries and associated next hop information contained in host table 400 indicate the most specific route to the destinations. Therefore, layer 3 packet forwarding devices typically search host table 400 before searching LPM table 402. LPM table 402 is operated in LPM mode and is populated with variable length IP prefixes, prefix lengths, and associated next hop information. When a layer 3 packet arrives at an LPM table operating in LPM mode, logical steps may be performed by a packet forwarding device where the subnet mask for each entry in the LPM table is applied to the destination IP address of the packet, and the masked address searched in the table. In some implementations, these steps may be performed in a single LPM lookup using a special data structure, such as a Radix tree. The entry with the longest prefix that matches the masked address in the received packet is used to extract next hop address information for the packet.

Referring to FIG. 4B, host table 404 is operated in host mode, and is populated with full length entries corresponding to hosts and related next hop information for routing layer 3 packets. Host table 404 contains full length addresses when operated in both host mode and in LPM mode, and as will be discussed below, in hybrid mode. LPM table 406, however, when operated in host mode, is populated in the same manner as host table 404. When operating in host mode, the prefix length for all entries in LPM table 406 are equal to the number of bits of the address. For example, a 32-bit IPv4 host entry in LPM table 406 would have a prefix length of 32, and a 128-bit IPv6 entry would have an associated prefix length of 128. By setting the prefix length for all entries in LPM table 406 to the full length of an address, operating LPM table 406 in host mode effectively converts it into a host table similar to table 404.

Referring to FIG. 4C, as stated above, host table 408 is populated with full length host entries like tables 400 and 404. LPM table 410, on the other hand, when operated in hybrid mode, is populated with both full length host entries and variable length IP prefixes/prefix lengths. The amount of memory space dedicated to either type of entry in LPM table 410 may be user-configured. For example, in one embodiment, the first 100 kilobytes of LPM table 410 may be configured to store full length host entries and fixed full length prefixes. The remaining memory space may be configured to operate in LPM mode and store variable length IP prefixes/prefix lengths similar to table 406. Accordingly, LPM table 410 may be operated in a hybrid mode that combines the features of tables 402 and 406.

Figure 5:
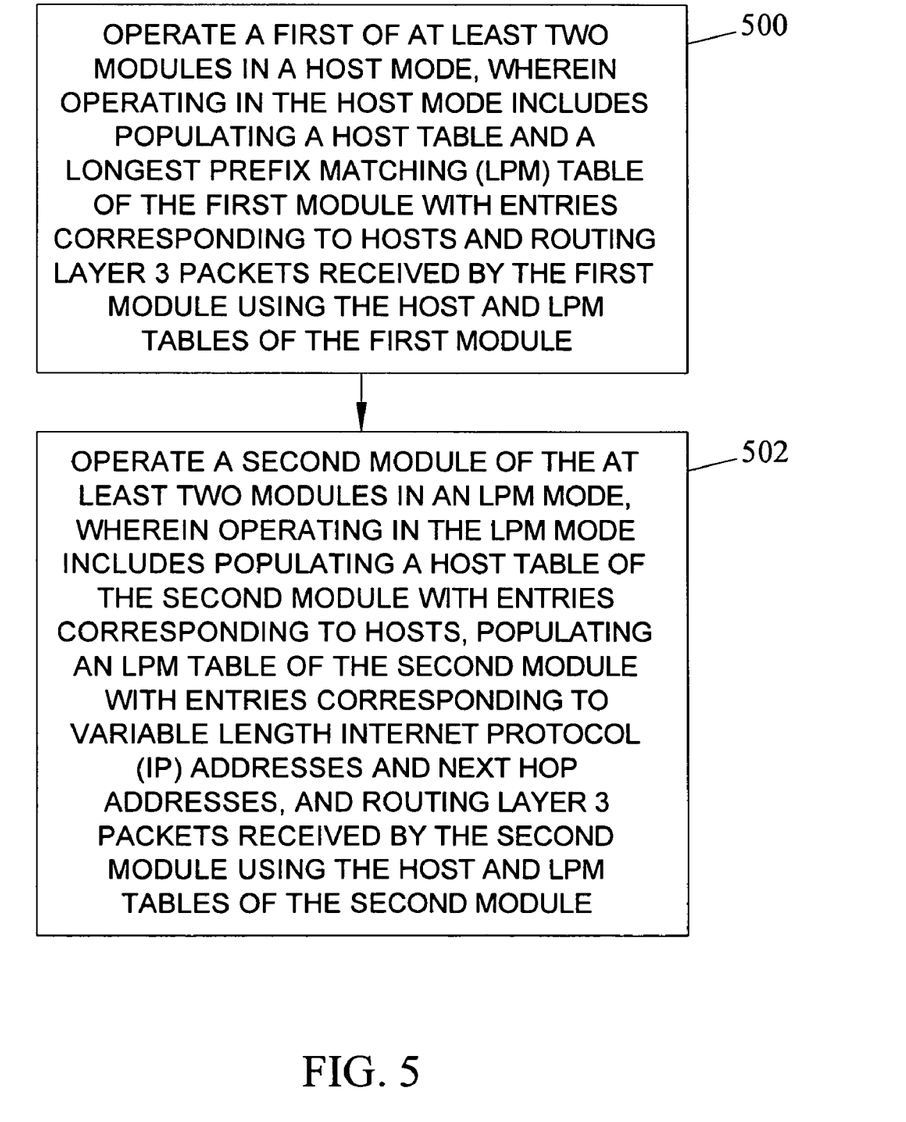
FIG. 5 is a flow chart illustrating an exemplary process for routing packets at a multi-mode layer 3 packet forwarding device according to an embodiment of the subject matter described herein.

FIG. 5 is a flow chart illustrating exemplary steps of a process for routing packets at a multi-mode layer 3 packet forwarding device according to an embodiment of the subject matter described herein. Referring to FIG. 5, a layer 3 packet forwarding device comprises at least two modules, each module comprising a host table and a longest prefix matching (LPM) table implemented in hardware. In step 500, a first module of at least two modules is operated in a host mode that includes populating a host table and an LPM table of the first module with entries corresponding to hosts and routing layer 3 packets received by the first module using the host and LPM tables of the first module.

In step 502, a second module of the at least two modules is operated in LPM mode that includes populating a host table of the second module with entries corresponding to hosts and populating an LPM table with entries corresponding to variable length Internet protocol (IP) addresses and next hop addresses. Layer 3 packets received by the second module are routed using the host and LPM tables of the second module.

It will be understood that various details of the invention may be changed without departing from the scope of the invention. Furthermore, the foregoing description is for the purpose of illustration only, and not for the purpose of limitation.

What is claimed is:

1. A method for routing packets at a multi-mode layer 3 packet forwarding device containing at least two modules, the method comprising:
   (a) determining, for each of the at least two modules, whether to operate in one of a host mode, an LPM mode, or a hybrid mode based on an expected utilization of each module in order to maximize the speed with which packets are routed;
   (b) in response to determining to operate a first module of the at least two modules in the host mode, operating the first module of the at least two modules in the host mode, wherein operating in the host mode includes populating a host table and a longest prefix matching (LPM) table of the first module with entries corresponding to hosts and routing layer 3 packets received by the first module using the host and LPM tables of the first module, wherein the entries corresponding to the hosts include full IP addresses for the hosts;
   (c) in response to determining to operate a second module of the at least two modules in the LPM mode, operating the second module of the at least two modules in the LPM mode, wherein operating in the LPM mode includes populating a host table of the second module with entries corresponding to hosts, populating an LPM table of the second module with entries corresponding to variable length Internet protocol (IP) addresses and next hop addresses, and routing layer 3 packets received by the second module using the host and LPM tables of the second module, wherein the operation of the at least two modules in the layer 3 packet forwarding device is tuned to efficiently forward packets for both large and small numbers of communicating hosts by provisioning the first module to operate in the host mode and the second module to operate in the LPM mode, wherein the entries corresponding to the hosts include full IP addresses for the hosts and
   (d) in response to determining to operate a third module of the at least two modules in a hybrid mode, operating the third module of the at least two modules in the hybrid mode, wherein operating in the hybrid mode includes populating a host table of the third module with entries corresponding to remote hosts, populating an LPM table of the third module with entries corresponding to remote hosts, remote host prefixes and next hop addresses, and routing layer 3 packets using the host and LPM tables of the third module, wherein the entries corresponding to the hosts include full IP addresses for the hosts.

2. The method of claim 1 wherein the host and LPM tables of the first and second modules are implemented in hardware.

3. The method of claim 1 wherein routing layer 3 packets using the host and LPM tables of the first and second modules includes performing a lookup in each host table using a complete destination IP address extracted from each packet and determining packet forwarding information based on the lookup.

4. The method of claim 1 wherein routing layer 3 packets using the host and LPM tables includes, at each of the first and second modules, performing a first lookup in the host table, and, in response to failing to locate a matching entry, performing a second lookup in the LPM table.

5. The method of claim 1 comprising removing entries in the host and LPM tables of the first and second modules based on a user-configured value associated with each entry.

6. A multi-mode layer 3 packet forwarding device containing at least two modules, the device comprising:
   (a) a switch management module for determining, for each of the at least two modules, whether to operate in one of a host mode, an LPM mode, or a hybrid mode based on an expected utilization of each module in order to maximize the speed with which packets are routed, wherein the operation of the at least two modules in the layer 3 packet forwarding device is tuned to efficiently forward packets for both large and small numbers of communicating hosts by provisioning the first module to operate in the host mode, provisioning the second module to operate in the LPM mode, and provisioning the third module to operate in the hybrid mode based on an expected utilization of each module in order to maximize the speed with which packets are routed;
   (b) first module for operating in a host mode, the first module including a layer 3 host table and a layer 3 longest prefix match (LPM) table including entries corresponding to hosts, and a packet forwarding engine for routing layer 3 packets received by the first module using the host and LPM tables of the first module, wherein the entries corresponding to the hosts include full IP addresses for the hosts;

(c) a second module for operating in an LPM mode, the second module including a layer 3 host table including entries corresponding to hosts, a layer 3 LPM table including entries corresponding to host prefixes and next hop addresses, and a packet forwarding engine for routing layer 3 packets received by the second module using the host and LPM tables of the second module, wherein the entries corresponding to the hosts include full IP addresses for the hosts; and (d) a third module for operating in a hybrid mode, wherein operating in the hybrid mode includes populating a host table of the third module with entries corresponding to remote hosts, populating an LPM table of the third module with entries corresponding to remote hosts, remote host prefixes and next hop addresses, and routing layer 3 packets using the host and LPM tables of the third module, wherein the entries corresponding to the hosts include full IP addresses for the hosts.

7. The device of claim 6 wherein the host tables located on the edge and aggregator modules are implemented in hardware.

8. The device of claim 6 wherein each entry in the host tables located on the edge and aggregator modules include an Internet protocol (IP) address and corresponding packet forwarding information.

9. The device of claim 6 wherein the LPM tables located on the edge and aggregator modules are implemented in hardware.

10. The device of claim 6 wherein each entry in the LPM tables located on the edge and aggregator modules include an Internet protocol (IP) address and corresponding packet forwarding information.

11. The device of claim 6 wherein the packet forwarding engines located on the edge and aggregator modules are adapted to perform a lookup in the host tables located on the edge and aggregator modules, and, in response to failing to locate a matching entry in the host tables located on the edge and aggregator modules, the packet forwarding engines located on the edge and aggregator modules are adapted to perform a lookup in the LPM tables located on the edge and aggregator modules.

12. The device of claim 6 wherein the host tables located on the edge and aggregator modules further comprise a user-configurable value corresponding to each remote host entry.

13. The device of claim 6 wherein the edge module adapted to route packets between one or more local area networks (LANs) and the Internet.

14. The device of claim 6 wherein the aggregator module adapted to combine many relatively low bandwidth connections into a few relatively high bandwidth connections.

15. The device of claim 6 further comprising a table update controller adapted to remove entries in the host and LPM tables based on a user-configured value associated with each remote host entry.

16. A non-transitory computer readable medium having stored thereon computer executable instructions that when executed by the processor of a computer perform steps comprising:

(a) determining, for each of the at least two modules, whether to operate in one of a host mode, an LPM mode, or a hybrid mode based on an expected utilization of each module in order to maximize the speed with which packets are routed;

(b) in response to determining to operate a first module of the at least two modules in the host mode, operating the first module of the at least two modules in the host mode, wherein operating in the host mode includes populating a host table and a longest prefix matching (LPM) table of the first module with entries corresponding to hosts and routing layer 3 packets received by the first module using the host and LPM tables of the first module, wherein the entries corresponding to the hosts include full IP addresses for the hosts;

(c) in response to determining to operate a second module of the at least two modules in the LPM mode, operating the second module of the at least two modules in the LPM mode, wherein operating in the LPM mode includes populating a host table of the second module with entries corresponding to hosts, populating an LPM table of the second module with entries corresponding to variable length Internet protocol (IP) addresses and next hop addresses, and routing layer 3 packets received by the second module using the host and LPM tables of the second module, wherein the operation of the at least two modules in the layer 3 packet forwarding device is tuned to efficiently forward packets for both large and small numbers of communicating hosts by provisioning the first module to operate in the host mode and the second module to operate in the LPM mode, wherein the entries corresponding to the hosts include full IP addresses for the hosts and (d) in response to determining to operate a third module of the at least two modules in a hybrid mode, operating the third module of the at least two modules in the hybrid mode, wherein operating in the hybrid mode includes populating a host table of the third module with entries corresponding to remote hosts, populating an LPM table of the third module with entries corresponding to remote hosts, remote host prefixes and next hop addresses, and routing layer 3 packets using the host and LPM tables of the third module, wherein the entries corresponding to the hosts include full IP addresses for the hosts.

\* \* \* \* \*